P. Bright.
Rolling Metal Bars or Hoops.
No. 67,404.   Patented Aug. 6, 1867.

Witnesses:

Inventor:
P. Bright
By his Atty
H. Howson

United States Patent Office.

PITTMAN BRIGHT, OF PHILADELPHIA, PENNSYLVANIA.

Letters Patent No. 67,404, dated August 6, 1867.

---

IMPROVEMENT IN ROLLING-MILLS.

---

The Schedule referred to in these Letters Patent and making part of the same.

---

TO ALL WHOM IT MAY CONCERN:

Be it known that I, PITTMAN BRIGHT, of Philadelphia, Pennsylvania, have invented certain Improvements in Rolling-Mills; and I do hereby declare the following to be a full, clear, and exact description of the same.

My invention relates to machinery for rolling band, hoop, or bar iron, and consists of two shafts with enlargements and permanent and adjustable collars, so as to form rolls which can be readily arranged for making hoop or bar iron of different widths, thereby dispensing with the usual costly and cumbrous rolls which have several grooves for different widths of bars or bands.

My invention further consists of adjustable collars made of two rings, one of them corrugated at the one end, so as to form a lodgment for the water, and so that undue expansion of parts of the roll may be prevented, as fully described hereafter.

In order to enable others skilled in the art to make and use my invention, I will now proceed to describe its construction and operation, reference being had to the accompanying drawing, which forms a part of this specification, and in which—

Figure 1:
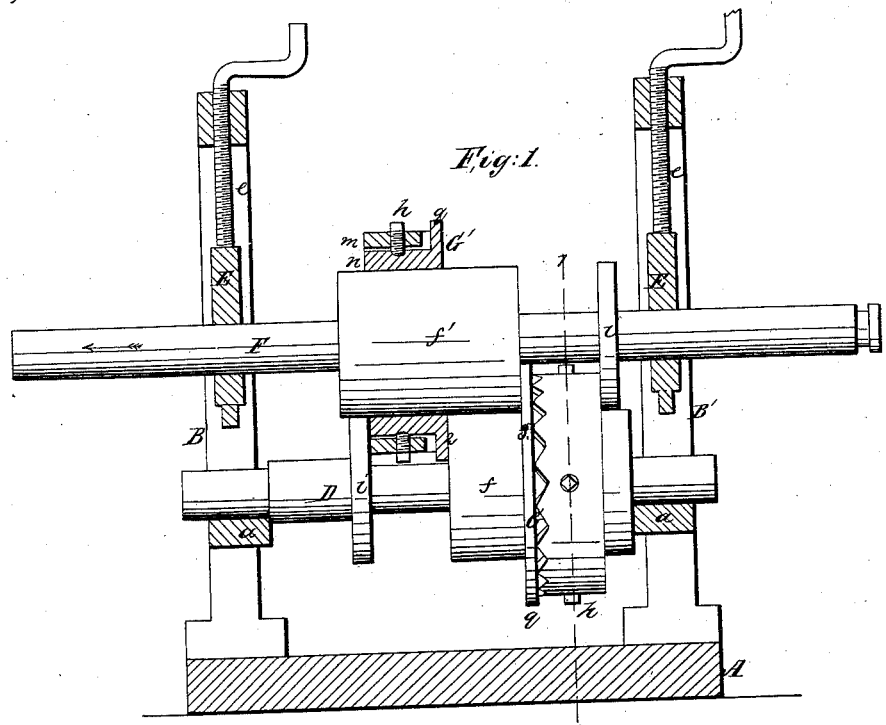
Figure 2:
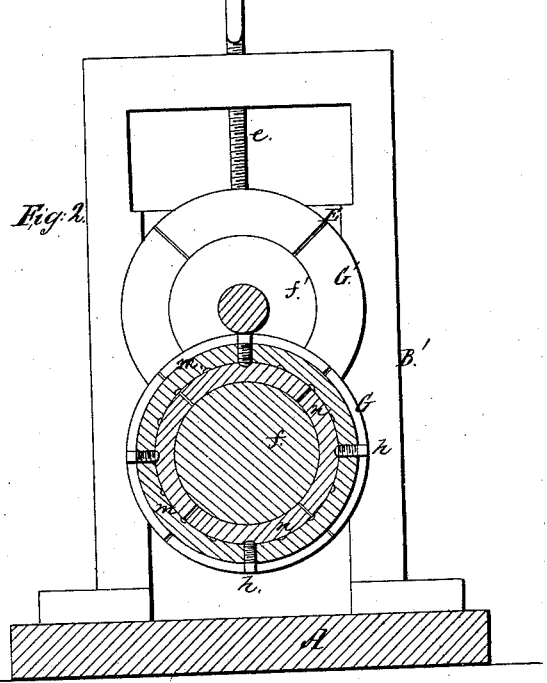

Figure 1 is a front view, partly in section, of my improved adjustable rolls, and Figure 2 a transverse vertical section on the line 1–2, fig. 1.

A is the base of the machine, to which are secured the two standards B and B', and on the latter are fixed bearings $a$ $a$ for the shaft D, the upper shaft F turning in adjustable bearings E, arranged to slide in vertical guides in the standards, and controlled by screws $e$ $e$, as in other rolling-mills. The lower shaft D has no longitudinal movement in its bearings $a$ $a$, but the upper shaft can be adjusted longitudinally in its bearings. An enlargement, $f$, is made on the shaft D for the reception of the adjustable collar G, and a similar enlargement, $f'$, is made on the upper shaft F for a similar adjustable collar G', and each of the shafts has a narrow permanent collar $i$. The collar G of the shaft D fits snugly, but so as to revolve freely between one end of the enlargement $f'$ and the permanent collar $i$ of the shaft F, while the collar G' of the latter shaft fits snugly, but so as to revolve freely between one end of the enlargement $f$ and the permanent collar $i$ of the shaft D. The two shafts are caused to revolve in contrary directions, as in other rolling-mills, and the heated bar is passed between the enlargements $f$ and $f'$ of the shafts, the width of the bar thus rolled being limited by the distance between the two adjustable collars G and G', or, in other words, the rolled bar will be equal in width to the distance between the lines 2 and 3, fig. 1. Should a narrower bar or strip be required, all that is necessary is to loosen the screws or other fastenings by which the collars G and G' are secured to their respective shafts, and then push the shaft F in the direction of the arrow to the desired distance, thereby forcing the enlargement $f'$ through the collar G' (while the latter is held between the collar $i$ and enlargement $f$ of the shaft D,) and at the same time drawing the collar G along the enlargement $f$ of the shaft D', after which the adjustable collars may be secured by screws or otherwise. It will now be evident that the adjustable collars may be moved nearer towards or further apart from each other at pleasure, and that my improvement is the means of dispensing with the usual costly and cumbrous rolls in which there are a number of grooves to suit bars or bands of different widths. In the present instance each of the adjustable collars consists of two rings, $m$ and $n$, the latter being fitted directly to the enlargement of the shaft, and being divided into four equal sections, projecting portions of which are enclosed by the outer ring $n$, and each of the sections being maintained in contact with the enlargement by a set-screw, $h$. It will be seen that the edge of the ring $m$ of each adjustable collar is corrugated where it bears against the rim $q$ of the collar, these corrugations forming recesses for the reception of water which finds its way through channels shown in fig. 2 to the surface of the portions of the enlargements $f$ and $f'$, which act on the surfaces of the iron, this continued lodgment of water in the recesses preventing the expansion of the collars.

I claim as my invention, and desire to secure by Letters Patent—

1. The shaft D, its collar $i$, enlargement $f$, and adjustable collar G, in combination with the shaft F, its collar $i$, enlargement $f'$ and adjustable collar G', the whole being constructed and arranged substantially as and for the purpose herein set forth.

2. The collar G or G', composed of the ring $m$ with its corrugated or notched end, and the ring $n$ with its rim $q$.

In testimony whereof I have signed my name to this specification in the presence of two subscribing witnesses.

PITTMAN BRIGHT.

Witnesses:
H. HOWSON,
W. J. R. DELANY.